United States Patent
White

(10) Patent No.: US 11,588,620 B2
(45) Date of Patent: Feb. 21, 2023

(54) FORMING A BLOCKCHAIN IN LOW-BANDWIDTH, RESOURCE-CONSTRAINED NETWORK

(71) Applicant: Itron, Inc., Liberty Lake, WA (US)

(72) Inventor: Eric Donald White, Seneca, SC (US)

(73) Assignee: Itron, Inc., Liberty Lake, WA (US)

( * ) Notice: Subject to any disclaimer, the term of this patent is extended or adjusted under 35 U.S.C. 154(b) by 22 days.

(21) Appl. No.: 17/138,657

(22) Filed: Dec. 30, 2020

(65) Prior Publication Data
US 2022/0209936 A1    Jun. 30, 2022

(51) Int. Cl.
*H04L 29/06*    (2006.01)
*H04L 9/06*    (2006.01)
*H04L 9/32*    (2006.01)
*H04L 9/00*    (2022.01)

(52) U.S. Cl.
CPC .......... *H04L 9/0637* (2013.01); *H04L 9/0643* (2013.01); *H04L 9/3297* (2013.01); *H04L 9/50* (2022.05)

(58) Field of Classification Search
None
See application file for complete search history.

(56) References Cited

U.S. PATENT DOCUMENTS

| | | | | |
|---|---|---|---|---|
| 2011/0188402 A1* | 8/2011 | Behroozi | ............. | H04W 28/18 370/252 |
| 2016/0283920 A1* | 9/2016 | Fisher | .................. | G06Q 20/065 |
| 2016/0292672 A1* | 10/2016 | Fay | ...................... | G06Q 20/363 |
| 2017/0012843 A1* | 1/2017 | Zaidi, III | ............ | H04L 41/0686 |
| 2019/0265059 A1 | 8/2019 | Warnick et al. | | |
| 2019/0303621 A1 | 10/2019 | Baset et al. | | |
| 2019/0349426 A1* | 11/2019 | Smith | ..................... | H04L 69/18 |
| 2019/0354518 A1 | 11/2019 | Zochowski | | |
| 2020/0005264 A1 | 1/2020 | Patterson et al. | | |
| 2020/0014542 A1 | 1/2020 | McIver et al. | | |
| 2020/0045167 A1 | 2/2020 | Byrne et al. | | |
| 2020/0125269 A1 | 4/2020 | Karame et al. | | |
| 2020/0186607 A1 | 6/2020 | Murphy et al. | | |
| 2020/0201683 A1 | 6/2020 | Muskal et al. | | |
| 2020/0228342 A1 | 7/2020 | Nixon et al. | | |

(Continued)

FOREIGN PATENT DOCUMENTS

| | | | | |
|---|---|---|---|---|
| EP | 3798772 A1 | | 3/2021 | |
| KR | 102376113 B1 * | | 3/2022 | .......... H04L 9/0825 |

(Continued)

OTHER PUBLICATIONS

Naveen Navile Nageshwara et al: "Low Bandwidth and Computational Capacity of the Nodes in Mobile Ad-Hoc Networks (MANETs)", International Journal of Engineering Research and Technology (IJERT), Nortice—2013, vol. 1, No. 4, Jan. 1, 2013 (Jan. 1, 2013 ), pp. 148-153, XP055877894, (Year: 2013).*

(Continued)

*Primary Examiner* — Andrew J Steinle
(74) *Attorney, Agent, or Firm* — Lee & Hayes, P.C.

(57) ABSTRACT

A device selects a plurality of other devices to participate in a blockchain based at least in part on observed behavior of a communication link between the device and each of the other devices. The device, based at least in part on the selecting, participates in the blockchain with at least some of the plurality of other devices.

20 Claims, 10 Drawing Sheets

(56) References Cited

U.S. PATENT DOCUMENTS

| | | |
|---|---|---|
| 2020/0228512 A1 | 7/2020 | Ateniese et al. |
| 2020/0250769 A1 | 8/2020 | Scheidler et al. |
| 2020/0412549 A1 | 12/2020 | Endo |
| 2022/0114156 A1 | 4/2022 | Maher et al. |
| 2022/0207016 A1 | 6/2022 | White |
| 2022/0207023 A1 | 6/2022 | White |

FOREIGN PATENT DOCUMENTS

| | | |
|---|---|---|
| WO | WO2019195755 A1 | 10/2019 |
| WO | WO2020108742 A1 | 6/2020 |
| WO | WO2020256998 | 12/2020 |

OTHER PUBLICATIONS

Naveen Navile Nageshwara et al: "Low Bandwidth and Computational Capacity of the Nodes in Mobile Ad-Hoc Networks (MANETs)", International Journal of Engineering Research and Technology (IJERT), Ncrtice—2013, vol. 1, No. 4, Jan. 1, 2013 (Jan. 1, 2013), pp. 148-153, XP055877894, Retrieved from the Internet: URL :https ://www. ije rt. o rg/research/low-bandwidth-and-com putationalcapacity-of-the-nodes-i n-mobile-ad-h oc-networks-manetsIJERTCONV1IS04046.pdf.

The International Search Report and Written Opinion for PCT Application No. PCT/US21/53010, dated Jan. 20, 2022.

The International Search Report and Written Opinion for PCT Application No. PCT/US21/53010, dated Jan. 21, 2022. 16 pages.

Office Action for U.S. Appl. No. 17/138,725, dated Jul. 7, 2022, White, "Secure Blockchain Data Recovery", 11 pages.

Office Action for U.S. Appl. No. 17/138,705, dated Sep. 12, 2022, White, "Secure Trimming of Blockchain in a Resource-Constrained Network", 11 pages.

Peng Zhao et al "A Secure Storage Strategy for Blockchain Based on MCMC Algorithm", Digital Object Identifier 10.1109/ Access. 2020.3020836 current version Sep. 15, 2020, 10 pages.

\* cited by examiner

FORMING A BLOCKCHAIN IN LOW-BANDWIDTH, RESOURCE-CONSTRAINED NETWORK

BACKGROUND

Blockchain technology may be used to guarantee the accuracy of stored information. Blockchain technology has many practical applications, including device authentication, secure data recovery and data authenticity guarantee.

A blockchain is a linked and growing list of records, called blocks, that are cryptographically linked to each other. For example, each block in a blockchain may include a cryptographic hash of the immediately previous block, a timestamp, and transaction data. Blockchain is resistant to undetectable modification of data contained within it. For example, once data in a block is recorded, the data cannot be undetectably changed, since doing so would require changing all subsequent blocks. A blockchain may be managed by a peer-to-peer network of nodes that communicate data with each other and that validate new blocks.

The communication and validation are highly consumptive of individual node and collective network resources. As a result, blockchain technology may severely affect the operation of a resource-constrained network. For example, a node in a network may have limited data storage, and only some of that limited storage may be available for block storage. As another example, inter-node network communication bandwidth may be limited, and only some of that limited inter-node communication bandwidth may be available for communicating block data.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Figure 1:
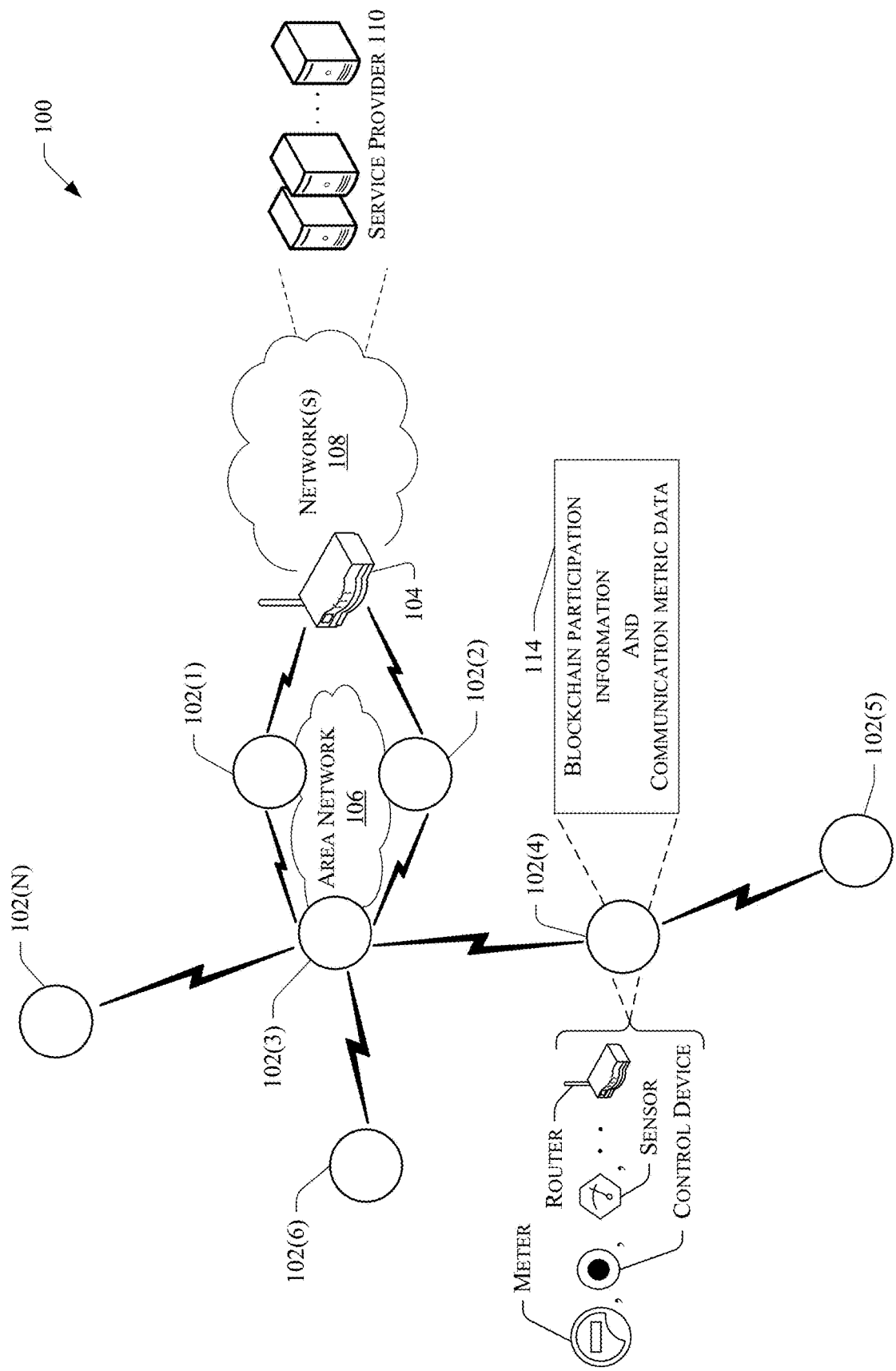
FIG. 1 is a schematic diagram of an example network architecture.

Blockchain technology implementations may severely affect the operation of a resource-constrained network including because, for example, in a typical blockchain, all data created and added to the blockchain is shared with all other devices in the blockchain. With respect to bandwidth resources, the concept of low bandwidth is relative. For example, Long-Term Evolution (LTE) is a standard for wireless broadband communication with throughput up to 300 Mbit/sec, per device, with bandwidth going down from that upper limit as devices congest the medium and cell towers. 5G wireless technology may provide higher throughput over time. With Wi-Fi, devices may transmit several hundreds of Mbit/sec, and that throughput continues to improve over time as Wi-Fi technology is enhanced.

The lower the bandwidth, the more significant may be degradation in performance of blockchain technology functions. As the distance between a transmitter and receiver increases, the throughput generally decreases. Furthermore, technologies to share RF medium and bandwidth can also degrade the throughput. For example, the RF spectrum is divided into frequency bands, and the bands are usually divided into channels within that band. For example, bands may be either public (e.g., ISM 900 MHz and 2.4 GHz) or private (bought spectrum, such as cellular bands, VHF, UHF, etc.). Any member of the public can operate in the public spectrum (for example, assuming the radio and usage meets FCC approval), but only the purchaser can use (or license within) the purchased bands. Public bands, in particular, are shared with many other devices, which often affects the ability of devices to transmit or receive over the public bands.

Bands are usually subdivided into channels, where a channel is some fraction of the total band. For example, 2.4 GHz Wi-Fi may use 14 channels where three of the channels (1, 6 and 11) are non-overlapping channels. This is because the bandwidth of a channel overlaps the four channels less than its frequency, and the four channels above its frequency. A radio can use any of the fourteen channels. For example, if a user chooses to use channel 4, there may be overlap with the primary channels 1 and 6, which can cause packet/transmission collisions.

The distance between two devices affects the likelihood that transmissions from the two devices will experience collisions, which may prevent reception by any other device. For example, if the transmissions from two devices reach a third device with sufficient signal strength from both transmitting devices, a collision may ensue to prevent the third device from receiving either transmission. If the signal from one is strong enough, but the other signal is weak, it is likely the stronger signal will be successfully received without interference from the other. This is primarily affected by range, but other factors (e.g., trees, buildings, rain, etc.) may also affect received signal strength.

There exist many technologies that allow for sharing of bands and/or channels while minimizing or eliminating collisions. For example, with time division, channels are coordinated so that a transmitter only transmits at allotted times. With channel division, devices are dedicated to specific channels such that other devices on different channels do not collide (or collisions are significantly reduced in probability). With frequency division multiplexing, packets are coded in a way such that the same channel can be shared, and more than one transmission can be simultaneously successfully received through the unique coding of transmissions. Using these technologies, a communication medium is still shared such that the total available bandwidth (e.g., 100 kbps) is shared across all multiple devices. For example, if no other device is transmitting, a device may be able to utilize the full bandwidth. However, if multiple devices are attempting to transmit at the same time, many of the devices may wait, getting effectively only a portion of the full bandwidth. If collisions occur, then the effective portion of the bandwidth may be even smaller, due to devices retrying transmission upon collision.

Certain network configurations use more bandwidth than other network configurations. For example, mesh-networks use more bandwidth than traditional "star" networks. A "star" network is one where all bandwidth-using devices connect directly to a central device, such as an "internet access point (TAP)." For example, the TAP may be a cell tower or other router connected to a high-bandwidth internet connection that is not part of the RF medium of the star network. With a "mesh" network, only some of the devices may connect directly to the central device. For some of the devices, RF traffic is passed through other devices forming a chain of devices responsible for delivering transmissions to/from the central device, such as where direct connection to the central device is not possible. The more "hops" traffic takes through other devices may result in less efficient use of the total available bandwidth. For example, if traffic takes two hops to reach the central device, at least two transmissions occur, plus overhead for device to device communication, to deliver a single packet. Also, most radios can only transmit, or receive, but not both at the same time.

Furthermore, in many configurations, transmissions directed from one device to another device utilize multiple transmissions in moving the data from the transmitter to the receiver. For example, the transmissions may utilize a transmission series that includes a "ready to send" (RTS), "clear to send" (CTS), data and acknowledgement (ACK). This means of data delivery is common in RF space and provides some assurance that data is reliably transmitted and received.

Mesh networks may be even less efficient due to the multi-hop functionality and through device connections to the TAP (to the internet or secondary network like Cellular). For every "hop" through another device, there may be a corresponding series of transmissions to accomplish the hop. For example, if data is provided by device A transmitting from A to B, then through C, D, and E and finally to the TAP, this is five hops, and thus five series of transmissions may be utilized to deliver a single data packet to the TAP. At least in this aspect, the multi-hop transmission uses at five times more bandwidth than a single-hop transmission in a star network configuration because, for example, the probability of collision increases. Note that because of range separation between the devices along the path, this means that devices on one end cannot hear devices on the other, and thus the RF medium may not actually be shared. If the RF medium is not shared by two devices, the devices may be able to transmit at the same time, which implies the inefficiency is less than five times (possibly significantly less, depending on other factors such as the channel sharing mechanisms), from an "entire network" perspective.

Blockchain is in its early days of adaptation in various applications and is generally regarded to have great future potential to solve many problems around security, data integrity, and authentication of data, users, and devices. However, blockchain in its basic form is very resource intensive, including using large amounts of storage and network bandwidth.

For example, blockchain implementations may require either consensus from all participants (nodes) in the network or, at least, require a large portion of participants to collaborate on transactions. This includes each node performing a transaction, adding data of the transaction to a block of a blockchain maintained by the node, and confirming the results, as well as the storage of the block. This also includes exchanging the block and the algorithmic outcomes among the nodes.

Some blockchain implementations have one or more points of central authority. The central authorities may have various different roles depending on the blockchain implementation. Some of these roles include generating master blockchains among the central authorities in collaboration with the other nodes, to improve performance. This may allow for faster transaction confirmation. Nodes participating in blockchain typically store all blocks forever.

Thus, for example, resource intensive blockchain technology generally includes large amounts of disk and/or other storage for the blocks as well as the network usage to distribute the blocks and the cryptographic results to achieve consensus on the transaction.

Ultimately, all devices participating in the blockchain network must receive all generated blocks. This can consume a very large amount of bandwidth to distribute all the data generated by every node, and then sent to every other node. In a mesh-network, this traffic being sent around from each device to each device over multiple hops may consume an enormous amount of network bandwidth (even, in some cases, beyond the capability of the network).

Storage requirements over time to maintain the record of all transactions ever performed can use a tremendous amount of storage space on each device requiring very large storage drives.

Devices that store data are subject to errors, such as in the disc or other storage mechanisms that might cause the data to become corrupted, which could render a blockchain invalid or otherwise untrustworthy.

Techniques described herein provide efficiencies for maintenance of a blockchain, such as in a resource-constrained network.

In accordance with a first technique, a device selects a plurality of other devices to participate in a blockchain based at least in part on observed behavior of a communication link between the device and each of the other devices. The device, based at least in part on the selecting, participates in the blockchain with at least some of the plurality of other devices.

In accordance with another technique, based at least in part on a determination of an amount of remaining storage available in a device being relative to a particular level, the device trims at least a portion of the blockchain from the device including by making storage allocated to the portion of the blockchain available. The device recalculates the blockchain without the portion of the blockchain that has been trimmed from the device. Further, the device sends a message to another device participating in the blockchain, the message including at least an indication of an amount of the blockchain for the other device to trim.

In accordance with another technique, a first device participating in a blockchain receives an indication of an error in the blockchain being maintained by the first device. The first device determines a defective block of the blockchain and receives a replacement for the defective block from a second device. The first device determines a recalculated blockchain that includes the replacement for the defective block.

Techniques described herein may have particular applicability to mesh networks, although their applicability is not necessarily so limited. A mesh network is a type of wireless ad hoc network (WANET). A wireless ad hoc network is considered to be ad hoc because connections between nodes of the network are formed dynamically, typically based on conditions under which the nodes individually and collectively are operating. Furthermore, nodes of a mesh network forward packets for other nodes and, in this way, may be considered to extend the distance which a node may transmit.

Nodes of a mesh network may communicate with neighboring nodes at Layer 2, whereas routing of packets among the nodes may be at higher than Layer 2. The topology of a mesh network may be considered to resemble a mesh. In some mesh networks, some nodes are not connected to others. Connectivity among nodes may be at least partially dependent on the behavior of the node, distance between the nodes and environmental conditions. Some mesh networks are relatively stable, such that connectivity among nodes changes infrequently or not at all. Other mesh networks are more dynamic, with connectivity among nodes changing as conditions change.

Each device may determine a link quality with each detected neighbor based on unicast transmission of sample packets to the detected neighbors and waiting for acknowledgements, with the link quality based at least in part on a success percentage of such transmissions. The link quality determined in this way or in other ways may provide a measure of the noise and interference in the communication channel and/or congestion in a receiving radio. Other link quality determinations may include, for example, an indication of signal to noise ratio for communication with a detected neighbor device as measured by the device. The link quality measure may be a quantitative measure of the receiving radio's ability to demodulate, decode, store, and forward a packet that is transmitted to it on that link. The link resistance may characterize a channel and/or band as seen by a frequency hopping or other spread spectrum radio receiver. Each device may maintain a list of the neighbor devices and maintain a table of link costs and path costs. Furthermore, each device may reevaluate (such as periodically and/or when transmission on a determined route degrades) the function and possibly change which neighbor the device uses to route packets to the destination. A device may determine the route cost for a particular route from itself to a destination, such as a head end access point, as a function of the link costs that make up that particular route.

A device can register itself with an access point by, for example, sending a unicast "AP Register" message (AREG). In response to a successful registration by a device, the access point can send down one or more messages to the device containing network configuration information and also containing blockchain participation information.

Example Environment

FIG. 1 is a diagram illustrating an example networked environment or architecture 100. The architecture 100 includes multiple network communication devices 102(1)-102(N) (collectively referred to as "network communication devices 102") and a network communication device 104, where N is any integer greater than or equal to 1. The network communication devices 102 and the network communication device 104 may be in communication with one another via an area network (AN) 106. One or more network communication devices 102 and/or the network communication device 104 may be participating in a blockchain.

In the example of FIG. 1, the network communication device 104 is implemented as an edge device, which serves as a connection point of the AN 106 to one or more networks 108 (e.g., a backhaul network), such as the Internet. The network communication device 104 may include, but is not limited to, a field area router (FAR), a cellular relay, a cellular router, an edge router, a DODAG (Destination Oriented Directed Acyclic Graph) root, a root device or node of the AN 106, a combination of the foregoing, or the like. In this example, the network communication device 104 relays communications from the AN 106 to a service provider 110 via the one or more networks 108. Any of the network communication devices 102, the network communication device 104, and/or the service provider 110 may perform processing to attribute information regarding communications with a first modulation scheme to a second modulation scheme.

As used herein, the term "area network" (AN) refers to a defined group of devices that are in communication with one another via one or more wired or wireless links. Examples of area networks include, for example, local area networks (LANs), neighborhood area networks (NANs), personal area networks (PANs), home area networks (HANs), field area networks (FANs), or the like. While only one AN 106 is shown in FIG. 1, in practice, multiple ANs may exist and may collectively define a larger network, such as an advanced metering infrastructure (AMI) of a utility communication network. At any given time, each individual device may be a member of a particular AN. Over time, however, devices may migrate from one AN to another geographically proximate or overlapping AN based on a variety of factors, such as respective loads on the ANs, battery reserves, interference, or the like.

The term "link" refers to a direct communication path between two devices (without passing through or being relayed by another device). A link may be over a wired or wireless communication path. Each link may represent a plurality of channels over which a device is able to transmit or receive data. Each of the plurality of channels may be defined by a frequency range which is the same or different for each of the plurality of channels. In some instances, the plurality of channels comprises Radio Frequency (RF) channels. The AN 106 may implement a channel hopping sequence, such that a channel may change over time. Although many examples discussed herein implement a plurality of channels as data channels, in some instances the plurality of channels include a control channel that is designated for communicating messages to specify a data channel to be utilized to transfer data. Transmissions on the control channel may be shorter relative to transmissions on the data channels.

The AN 106 may comprise a mesh network, in which the network communication devices relay data through the AN 106. Alternatively, or additionally, the AN 106 may comprise a star network, in which a central device acts as a parent to one or more children devices. Further, in some instances the AN 106 may include a portion that is implemented as a mesh network and a portion that is implemented as a star network. Moreover, in other instances the AN 106 may be implemented in whole or part by other types of networks, such as hub-and-spoke networks, mobile networks, cellular networks, etc. In some instances, a device may be able to communicate with multiple different types of networks (e.g., a mesh network and a star network) at the same or different times. For instance, if a device is unable to discover a suitable device in a mesh network mode, the device may attempt to connect to a nearby star network, mobile data collection network, or cellular network. Regardless of the topology of the AN 106, individual network communication devices may communicate by wireless (e.g., radio frequency) and/or wired (e.g., power line communication, Ethernet, serial, etc.) connections.

In some instances, the service provider 110 comprises one or more central office systems that include a security service such as Authentication, Authorization and Accounting (AAA) server, a network registration service such as Dynamic Host Configuration Protocol (DHCP) server, a network management service (NMS), a collection engine (CE), a meter data management system (in the utility context), a customer relationship management system (in the sales context), a diagnostic system (in a manufacturing context), an inventory system (in a warehouse context), a patient record system (in the healthcare context), a billing system, etc. Network communication devices may register or interact with some or all of these one or more central office systems. In one example, the one or more central office systems may implement a meter data management system to collect resource consumption data from the network communication devices of the AN 106, process the resource consumption data, provide data regarding resource consumption to customers, utilities, and others, and/or perform a variety of other functionality. In other instances, the service provider 110 comprises other systems to implement other functionality, such as web services, cloud services, and so on. In yet other instances, the service provider 110 may be implemented as other types of devices, such as in the context of the Internet of Things (IoT) that allows a variety of devices to exchange data.

The service provider 110 may be physically located in a single central location, or it may be distributed at multiple different locations. The service provider 110 may be hosted privately by an entity administering all or part of the communications network (e.g., a utility company, a governmental body, distributor, a retailer, manufacturer, etc.), or may be hosted in a cloud environment, or a combination of privately hosted and cloud hosted services.

As noted above, any of the network communication devices 102, the network communication device 104, and/or the service provider 110 may communicate according to various modulation schemes and perform processing to determine and indicate a preferred modulation scheme. In the FIG. 1 illustration, the data structure 114 may include an indication of how the network communication device 102(4) is configured for participation in a blockchain with other network communication devices 104. For example, the service provider 110 may centrally manage blockchains being maintained by the network communication device 102(4) and the other network communication devices 102, and the service provider 110 may provide the blockchain participation information as part of the blockchain management.

The data structure 114 may also include communication metric data maintained by the network communication device 102(4) and/or provided to the network communication device 102(4). Communication metric data may include a detected/measured value, a computed value, or any other statistic, metric, or value related to communication. For example, communication metric data may indicate a number of transmission attempts (e.g., a number of transmissions sent), a number of successful transmissions (e.g., a number of transmissions that are acknowledged by a receiving node), a number of unsuccessful transmissions (e.g., calculated by subtracting a number of transmission attempts by a number of acknowledgements), a ratio of successful transmissions to attempted transmissions, and so on. Further, in some examples communication metric data includes an Expected Transmission (ETX) metric and/or an Expected Transmission Time (ETT) metric, as discussed in further detail below.

In many instances, communication metric data may include data that is specific to a particular modulation scheme and/or to a particular link (e.g., direct communication path between devices). To illustrate, communication metric data may indicate a number of successful transmissions and a number of transmission attempts via a particular link (between a first node and a second node) with a particular modulation scheme.

An ETX metric may generally indicate an expected number of transmissions required to successfully send a transmission to a device. The ETX metric may be computed in a variety of manners. In one example, an ETX metric equals a total number of transmissions sent (e.g., transmission attempts) over a number of successful transmissions (e.g., transmissions acknowledged). In another example, an ETX metric equals $1/P$, where $P=Pf \times Pr$. Here, Pf corresponds to a probability that a transmission successfully arrives at a recipient, and Pr corresponds to a probability that an acknowledgment transmission is successfully received by a sender.

An ETT metric may generally indicate an expected time required to successfully send a transmission to a device. In one example, the ETT metric equals a time to transmit a transmission of a given size multiplied to the ETX metric.

Example Network Communication Device

Figure 2:
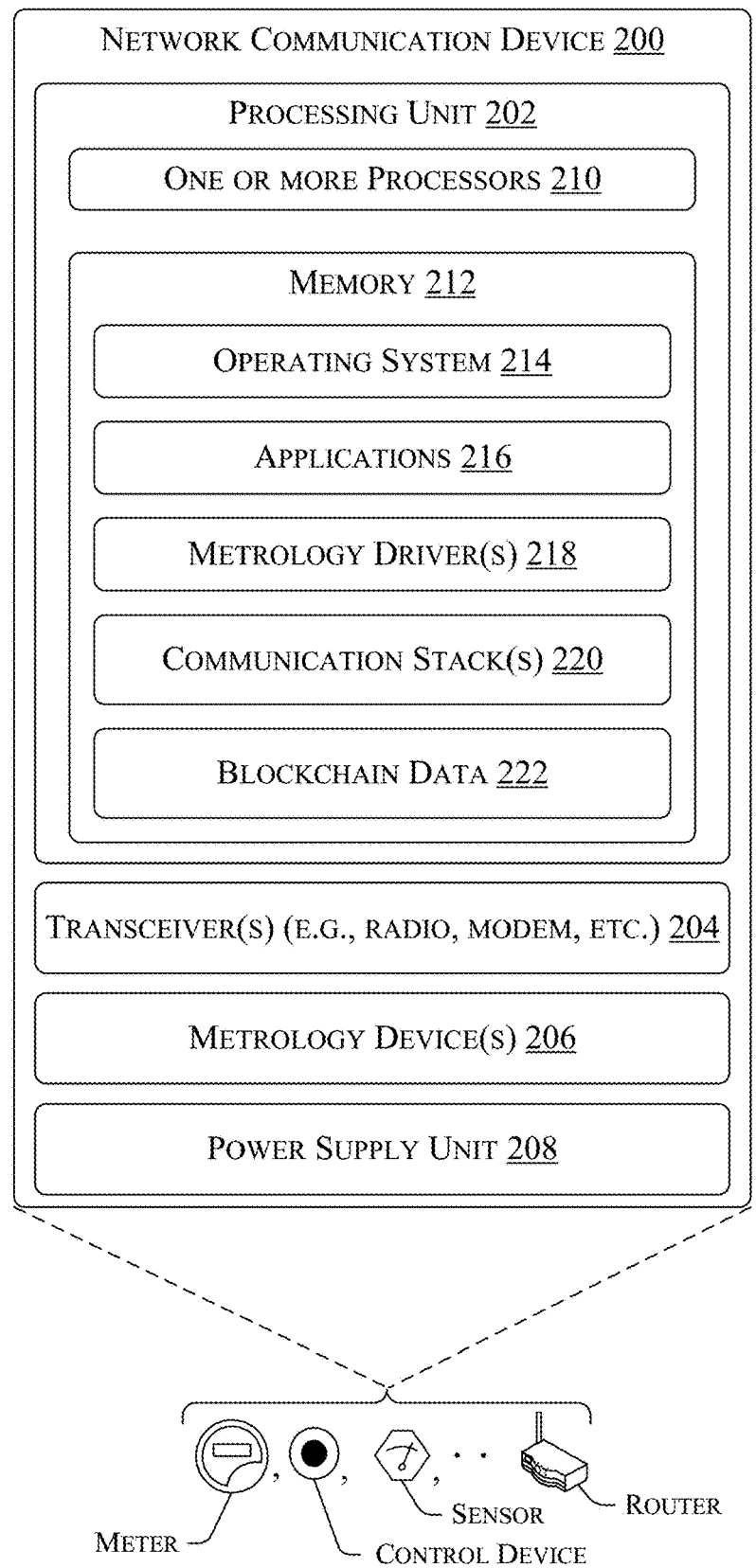
FIG. 2 is a diagram showing details of an example network communication device.

FIG. 2 is a diagram showing details of an example network communication device 200, such as any of the network communication devices 102 or the network communication device 104. The network communication device 200 may be participating in a blockchain. The network communication device 200 may comprise any type of network communication device (sometimes referred to as a node, computing device, or just device), such as a router (e.g., a field area router (FAR), a cellular router, an edge router, etc.), a utility meter (e.g., electricity, water, or gas meter), a relay (e.g., a cellular relay), a repeater, a transformer, a sensor, a switch, a control device, an encoder/receiver/transmitters (ERTs), an appliance, a personal computer (e.g., a desktop computer, a laptop computer, etc.), a mobile device (e.g., a smartphone, a tablet, a personal digital assistant (PDA), an electronic reader device, etc.), a wearable computer (e.g., a smart watch, an optical head-mounted display (OHMD), etc.), a server, an access point, a portable navigation device, a portable gaming device, a portable media player, a television, a set-top box, a computer system in an automobile (e.g., navigation system), a camera, a robot, a hologram system, a security system, a home-based computer system (e.g., an intercom system, a home media system, etc.), a projector, an automated teller machine (ATM), and so on.

In some instances, the network communication device 200 comprises a Full Function Device (FFD), while in other instances the network communication device 200 comprises a Limited Function Device (LFD). An FFD may include more functionality/resources than an LFD, such as different processing powers, processing capabilities, power reliance, hardware components, etc. In one example, an FFD is implemented as a Mains Powered Device (MPD) that is connected to mains electricity (e.g., electricity meters), while an LFD is implemented as a Battery Powered Device (BPD) that is not connected to mains electricity (e.g., a water meter, gas meter, etc. that employs batteries). Since an MPD relies on mains power, the MPD may remain in an active state (e.g., a state associated with consuming more than a threshold amount of power). Meanwhile, since a BPD relies on battery power, the BPD may enter a sleep state (e.g., a state associated with consuming less than a threshold amount of power) when the BPD is not communicating or otherwise performing operations. The BPD may use a communication schedule to determine when to enter a sleep state and/or when to enter an active state. This may allow the BPD to conserve battery life. In some instances, components of LFDs are lower power components than the corresponding components of the FFDs.

As shown in FIG. 2, the example network communication device 200 includes a processing unit 202, a transceiver(s) 204 (e.g., radio, modem, etc.), one or more metrology devices 206, and a power supply unit 208. The processing unit 202 may include one or more processors 210 and memory 212. The one or more processors 210 may comprise microprocessors, central processing units, graphics processing units, or other processors usable to execute program instructions to implement the functionality described herein. Additionally, or alternatively, in some examples, some or all of the functions described may be performed in hardware, such as an application specific integrated circuit (ASIC), a gate array, or other hardware-based logic device.

The transceiver(s) 204 may comprise one or more hardware and/or software implemented radios to provide two-way RF communication with other network communication devices in the AN 106 and/or other devices via the network 108. The transceiver(s) 204 may additionally or alternatively include a modem to provide power line communication (PLC) communication with other network communication devices that are connected to an electrical service grid.

In some instances, the transceiver(s) 204 may include different characteristics depending on the type of device implementing the transceiver(s) 204. For example, while both FFDs and LFDs have transceivers, the specific transceivers used may be different. To illustrate, an FFD transceiver may include a PLC modem while an LFD transceiver may not because the LFD is not connected to an electrical power line that could be used for PLC communications. Additionally, or alternatively, an LFD transceiver may employ a lower power RF radio to minimize energy consumption.

The metrology device(s) 206 comprises physical hardware and/or sensors to measure consumption data of a resource (e.g., electricity, water, or gas) at a site of the meter. In the case of an electric meter, for example, the metrology device(s) 206 may include one or more Hall effect sensors, shunts, or the like. In the case of water and gas meters, the metrology device(s) 206 may comprise various flow meters, pressure sensors, or the like. The metrology device(s) 206 may report the consumption data to a service provider via the transceiver(s) 204. The consumption data may be formatted and/or packetized in a manner or protocol for transmission.

The power supply unit 208 may provide power to the network communication device 200. In some instances, such as when the network communication device 200 is implemented as an FFD, the power supply unit 208 comprises a mains power connector that couples to an Alternating Current (AC) or Direct Current (DC) mains power line where the network communication device 200 is installed. In other instances, such as when the network communication device 200 is implemented as an LFD, the power supply unit 208 comprises a battery, such as a Lithium Thionyl Chloride battery (e.g., a 3 volt battery having an internal impedance rated at 130 Ohms), a Lithium Manganese battery (e.g., a 3 volt battery having an internal impedance rated at 15 Ohms), a Lithium Ion battery, a lead-acid battery, an alkaline battery, and so on.

The memory 212 includes an operating system (OS) 214 and one or more applications 216 that are executable by the one or more processors 210. The memory 212 may also include one or more metrology drivers 218 configured to receive, interpret, and/or otherwise process metrology data collected by the metrology device(s) 206. Additionally, or alternatively, one or more of the applications 216 may be configured to receive and/or act on data collected by the metrology device(s) 206.

The memory 212 may also include one or more communication stacks 220. In some examples, the communication stack(s) 220 may be configured to implement a 6LowPAN protocol, an 802.15.4e (TDMA CSM/CA) protocol, an 802.15.4-2015 protocol, 802.15.4g protocol, and/or another protocol. However, in other examples, other protocols may be used, depending on the networks with which the device is intended to be compatible. The communication stack(s) 220 describe the functionality and rules governing how the network communication device 200 interacts with each of the specified types of networks. For instance, the communication stack(s) 220 may cause FFDs and LFDs to operate in ways that minimize the battery consumption of LFDs when they are connected to these types of networks.

As illustrated, the memory 212 may also store blockchain data 222. The blockchain data 222 may be, for example, any possible series of 1's and 0's of any size. Blockchain data 222 may be updated from time to time based, for example, on transactions/blocks being added to a blockchain and/or transactions/blocks being trimmed from the blockchain.

In some instances, the network communication device 200 may be configured to send or receive communications on multiple channels simultaneously. For example, the transceiver(s) 204 may be configured to receive data at the same time on hundreds of channels. Additionally, or alternatively, the transceiver(s) 204 may be configured to send data at the same time on hundreds of channels.

The network communication device 200 may be configured to implement a variety of modulation schemes. A modulation scheme may be associated with a modulation type, a data rate, and/or other parameters. In some instances, a same modulation type is used for different modulation schemes to produce different data rates.

The memory 212 of the network communication device 200 may include software functionality configured as one or more "modules." The modules are intended to represent example divisions of software for purposes of discussion, and they are not intended to represent any type of requirement or required method, manner or necessary organization. Accordingly, while various "modules" are discussed, their functionality and/or similar functionality could be arranged differently (e.g., combined into a fewer number of modules, broken into a larger number of modules, etc.).

The various memories described herein (e.g., the memory 212) are examples of computer-readable media. Computer-readable media may take the form of volatile memory, such as random-access memory (RAM) and/or non-volatile memory, such as read only memory (ROM) or flash RAM. Computer-readable media devices include volatile and non-volatile, removable and non-removable media implemented in any method or technology for storage of information such as computer-readable instructions, data structures, program modules, or other data for execution by one or more processors of a computing device. Examples of computer-readable media include, but are not limited to, phase change memory (PRAM), static random-access memory (SRAM), dynamic random-access memory (DRAM), other types of random access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transitory medium that can be used to store information for access by a computing device. As defined herein, computer-readable media does not include transitory media, such as modulated data signals and carrier waves, and/or signals.

While detailed examples of certain network communication devices are described herein, it should be understood that those network communication devices may include other components and/or be arranged differently. As noted above, in some instances a network communication device may include one or more processors and memory storing processor executable instructions to implement the functionalities they are described as performing. Certain network communication devices may additionally or alternatively include one or more hardware components (e.g., application specific integrated circuits, field programmable gate arrays, systems on a chip, and the like) to implement some or all of the functionalities they are described as performing. Further, certain network communication devices may include one or more network interfaces to send or receive data.

Figure 3:
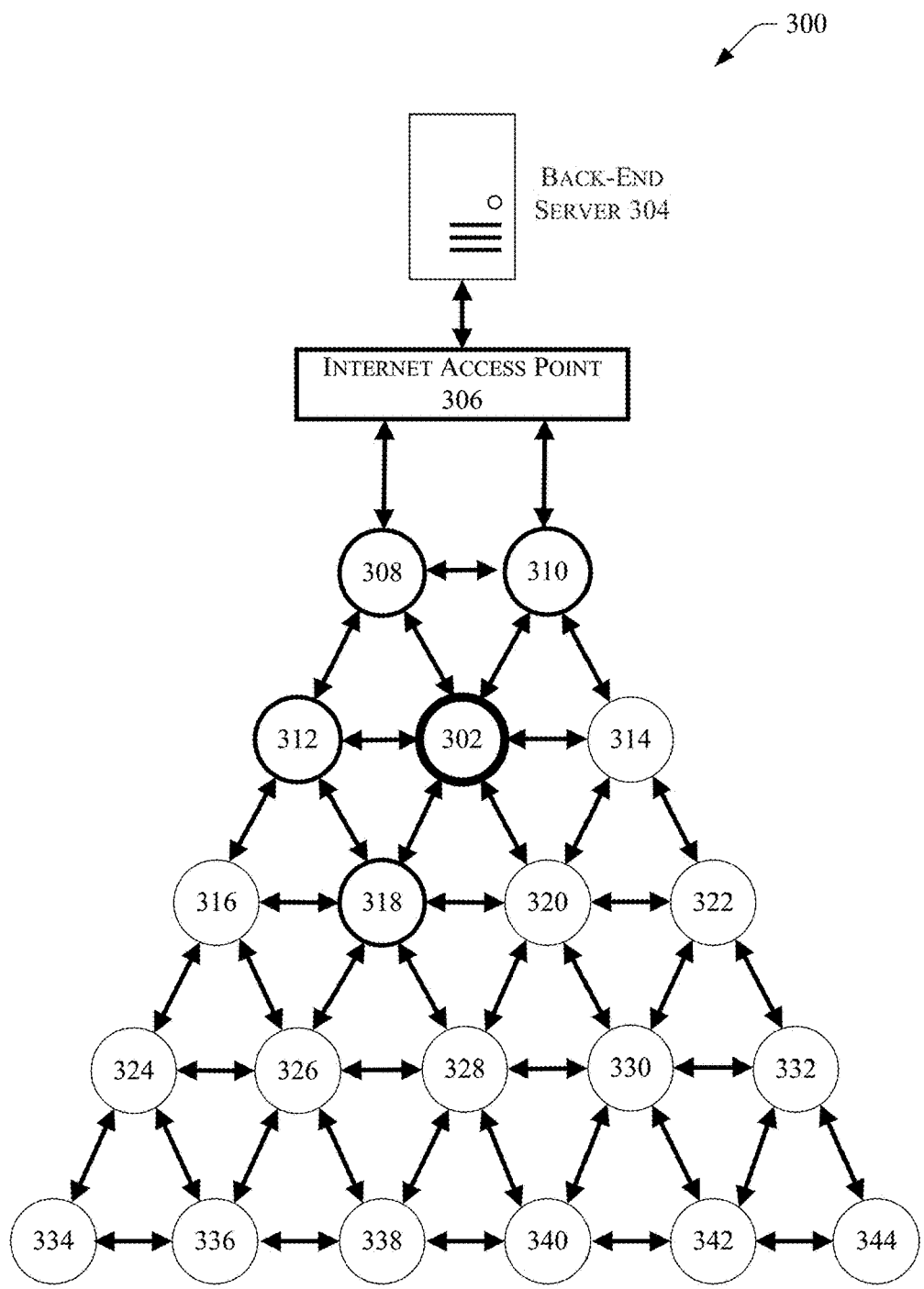
FIG. 3 illustrates an example mesh network in which a device forms a blockchain with other devices of the mesh network.

FIG. 3 illustrates an example mesh network 300 in which a device 302 (which may be referred to as a "target device") forms a blockchain with other devices of the mesh network 300. The mesh network 300 is coupled to a back-end server 304 via an internet access point 306. For example, the back-end server 304 may comprise one or more central office systems that, among other functions, serve to collect data such as utility usage data from devices of the mesh network 300. The mesh network includes the target device 302, the device 308, the device 310, the device 312, the device 314, the device 316, the device 318, the device 320, the device 322, the device 324, the device 326, the device 328, the device 330, the device 332, the device 334, the device 336, the device 338, the device 340, the device 342 and the device 344.

To form the blockchain with other devices of the mesh network 300, the target device 302 may observe behavior of a link between the target device 302 and other devices of the mesh network 300. For example, the target device 302 may observe behavior of a link between the target device 302 and the device 308, the device 310, the device 312 and so on to the device 332. The device 334, the device 336, the device 338 and so on to the device 344 may be too far from the target device 302 to form a link with the target device 302. The device 324, the device 326, the device 328 and so on to the device 332 may be close enough to form a link to the target device 302 but, based at least in part on algorithms used by the devices to form the mesh network 300, may not be one-hop neighbors of the target device 302 for communication via the mesh network 300.

Based at least in part on observing the behavior of the link between the target device 302 and other devices of the mesh network 300, the target device 302 may select a number of other candidate participant devices to participate in the blockchain. For example, the target device 302 may choose as candidate participant devices the six devices that have the best communication behavior, such as having the highest packet success ratio for transmissions from the target device 302, out of all the devices in the mesh network 300. In some examples, the number of other devices the target device 302 selects as candidate participant devices is based on a configuration and/or communication from the back-end server 304, provided to the target device 302 via the internet access point 306. As another example, the devices may be selected based on the amount of total energy used, as measured, for example, by the total network bandwidth consumed, transmissions/receptions and/or transmit output power.

In the FIG. 3 example, the target device 302 may select as candidate participant devices the six devices that include the device 308, the device 310, the device 312, the device 314, the device 318 and the device 320. In this example, all of the six devices are one-hop neighbors of the target device 302 for communication via the mesh network 300. However, at least some of the candidate participant devices may, in some examples, be devices that are greater than one hop away from the target device 302 for communication via the mesh network 300. Furthermore, as conditions, such as environmental conditions, change in and/or around the mesh network 300, the devices selected as candidate participants for the blockchain may also change, since the performance of the links between the target device 302 and other devices of the mesh network 300 may also change with changing conditions.

After selecting the device 308, the device 310, the device 312, the device 314, the device 318 and the device 320 as candidate participant devices, the target device 302 sends a request to some of the selected candidate participant devices to participate in the blockchain. On receipt of the request, each of the requested candidate participant devices may, in some examples, perform processing to determine if it will indicate agreement to be a participant in the blockchain as requested by the target device 302. For example, the number of candidate participant devices to which the target device 302 initially sends such a request may be less than the number of candidate participant devices. In one example, the number of candidate participant devices to which the target device 302 initially sends such a request is four, while the number of candidate participant devices is six. For example, the target device 302 may send the request to the four best candidate participant devices as indicated by some observed parameter such as the packet success ratio for transmission of packets over the link from the target device 302 to the candidate participant device.

For example, the target device 302 may send the request to the four best candidate participant devices which, in the FIG. 3 example, may be the device 308, the device 310, the device 312 and the device 320. Each requested candidate participant device may determine if it will indicate agreement to be a participant in the blockchain as requested by the target device 302. For example, each requested candidate participant node may determine whether it has a sufficient quality link to the target device 302. In some examples, link quality may be asymmetric such that the target device 302 perceives or otherwise observes a link of a particular quality to a candidate participant device while the candidate participant device does not perceive or otherwise observe the same particular quality for the reverse link, to the target device 302. Other criteria for a candidate participant device to determine if it will indicate agreement to be a participant in the blockchain as requested by the target device 302 may include whether the candidate participant device has a particular amount of storage available to participate in the blockchain, how many other blockchains in which the candidate participant device is already participating, and/or how busy the candidate participant device is with processing other than blockchain processing generally. These are examples, and other criteria are possible for use by the candidate participant device to determine if it will indicate agreement to be a participant in the blockchain as requested by the target device 302.

In one example, the device 308, the device 310 and the device 312 may respond to the target device 302 with a message indicating agreement to be a participant in the blockchain as requested by the target device 302. On the other hand, in the example, the device 320 may respond to the target device 302 with a message indicating non-agreement to be a participant in the blockchain as requested by the target device 302, or the device 320 may not respond at all to the request from the target device 302.

Continuing with the example, the target device 302 may now request one of the remaining candidate participant devices (the device 314 and the device 318) to be a participant in the blockchain. In the example, the device 318 responds to the target device 302 with a message indicating agreement to be a participant in the blockchain as requested by the target device 302. At this point, four devices—the device 308, the device 310, the device 312 and the device 318—have responded to the target device 302 with a message indicating agreement to be a participant in the blockchain as requested by the target device 302. Since the target device 302, in the example, has been configured to participate in the blockchain with four other devices, the target device 302 indicates to each of the four devices that it has been finally selected to be a participant in the blockchain. Even if the device 314 responds to the target device 302 with a message indicating agreement to be a participant in the blockchain as requested by the target device 302, the device 314 is not needed, and the target device 302 will proceed with the blockchain without the device 314 as a participant. If there are not enough candidate participant devices that indicate agreement to participate in the blockchain, the target device 302 may proceed with the blockchain with those candidate participant devices that have indicated agreement to participate in the blockchain. If there are no other devices that indicate agreement to participate in the blockchain, the target device 302 may continue to store data in its own local blockchain. The target device 302 may later (e.g., periodically) repeat the process of identifying candidate participant devices and requesting the candidate participant devices to participate in the blockchain.

After identifying the four participant devices, the target device 302 may send an initiation message to each of the four devices, or the target device 302 may directly initiate the blockchain with the four devices by, for example, sending each of the four devices one or more blocks of data of the blockchain. The four devices, as well as the target device 302, separately perform data storage and computations in accordance with the blockchain. Furthermore, in some examples, the four devices and the target device 302 report to the back-end server 304, via the mesh network 300 and the internet access point 306, data produced in accordance with the blockchain, such as one or more hash values determined in accordance with the blockchain. This may include, for example, a hash value from each of the device 308, the device 310, the device 312 and the device 318 and the target device 302 as determined for the most recent block in the blockchain.

In some examples, the network is "unreliable." This may mean that there will be situations, in operation of the blockchain, in which blocks are not received by all participating devices from the target device 302. There may be a mechanism for participating devices that are missing blocks to request one or more missing blocks from the target device 302. In some examples, logic within the target device 302 may assume that, based on receiving a hash from a participating device, communication between the target device 302 and the participating device is working reliably and the participating device has received all all of the blocks that the target device 302 has attempted to provide to the participating device.

Figure 4:
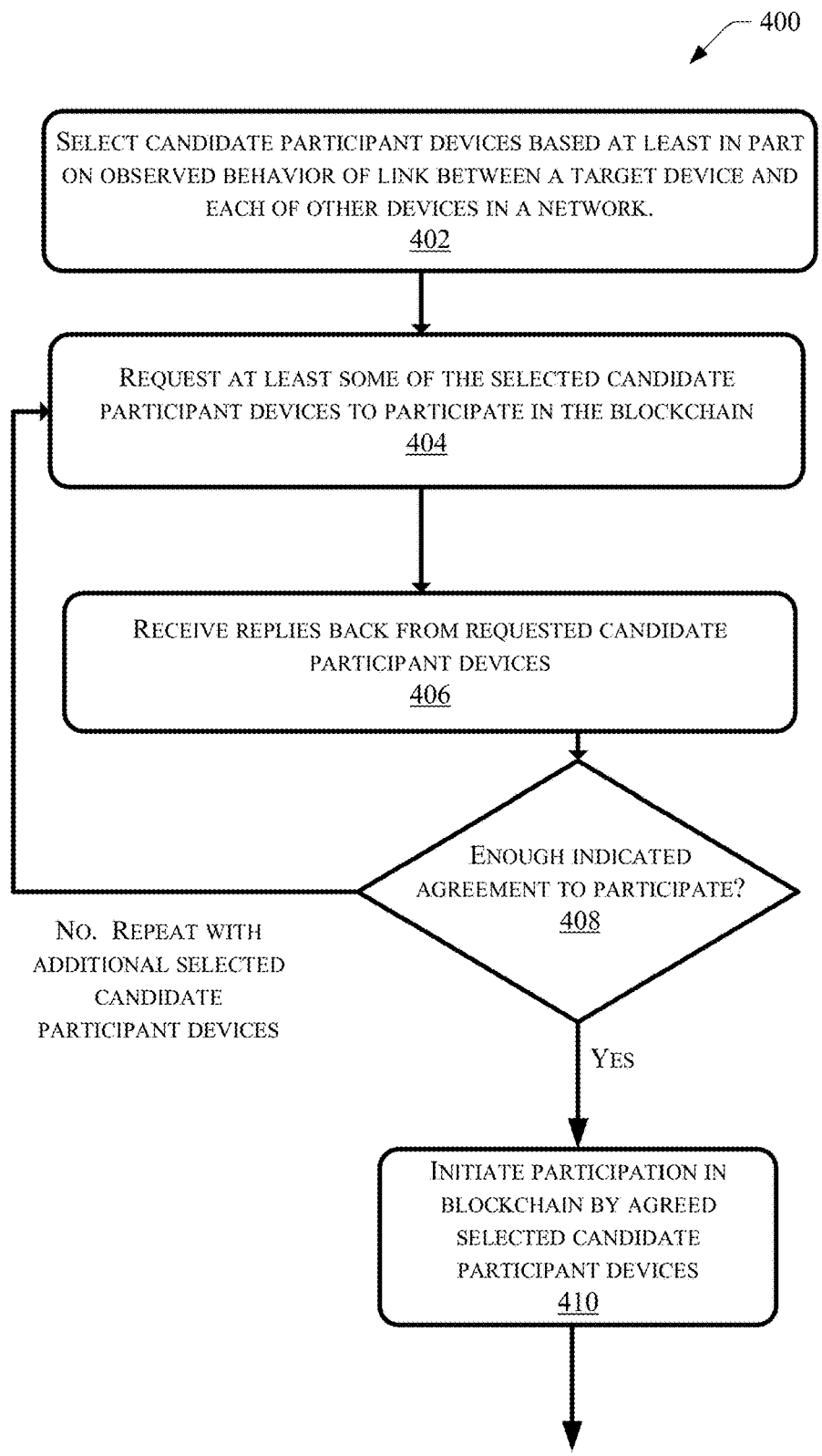
FIG. 4 is a flowchart illustrating an example process for a target device to form a blockchain with other devices in a network, such as in a mesh network.

FIG. 4 is a flowchart illustrating an example process 400 for a target device to form a blockchain with other devices in a network, such as in a mesh network. Each process described herein is illustrated as logical flow graphs, each operation of which represents a sequence of operations that can be implemented in hardware, software, or a combination thereof. In the context of software, the operations represent computer-readable instructions stored on one or more computer-readable storage media that, when executed by one or more processors, perform the recited operations. Generally, computer-readable instructions include routines, programs, objects, components, data structures, and the like that perform particular functions or implement particular abstract data types. In some contexts of hardware, the operations may be implemented (e.g., performed) in whole or in part by hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. The order in which the operations are described is not intended to be construed as a limitation, and any number of the described operations can be combined in any order and/or in parallel to implement the process. Further, any number of the described operations may be omitted.

Referring to FIG. 4, at 402, the target device selects candidate participant devices based at least in part on observed behavior of a link between the target device and each of other devices in a network. For example, in operation of a mesh network, the target device may already be maintaining a neighbor table. The neighbor table may include, for each other device reachable in a one hop link, an identification of the other device (e.g., a MAC address) and an indication of behavior of the one-hop link, such as one or more of a packet success ratio, signal to noise ratio and/or other data gleaned from observing transmission and/or receipt of data over the link. The target device may select the best neighbor devices as candidate participant devices, such as by selecting the neighbor devices for which the link between the target device and the neighbor device has the highest packet success ratio. The target device may have been configured to select a particular number of candidate participant devices, such as having been configured by a back-end server.

At 404, the target device requests at least some of the selected candidate participant devices to participate in the blockchain. For example, the target device may send a request message to each selected candidate participant device over a link between the target device and the respective candidate participant device. For example, the target device may be configured to participate in the blockchain with a particular number of devices, where the particular number of devices is less than the particular number of candidate participant devices.

At 406, the target device receives replies from the requested candidate participant devices. At 408, the target device determines if enough of the requested candidate participant devices have indicated agreement to participate. For example, the target device may compare the number of candidate participant devices that have indicated agreement to participate with the particular number of participant devices with which the target device has been configured.

If the target device determines that not enough of the requested candidate participant devices have indicated agreement to participate, then the target device repeats processing at 404 with additional selected candidate participant devices. Otherwise, at 410, the target device initiates participation in the blockchain by the agreed selected candidate participant devices. The initiation may be, for example, by the target device sending an initiation message to the selected candidate participant devices and/or sending the agreed selected candidate participant devices the data of one or more blocks of the blockchain.

Figure 5:
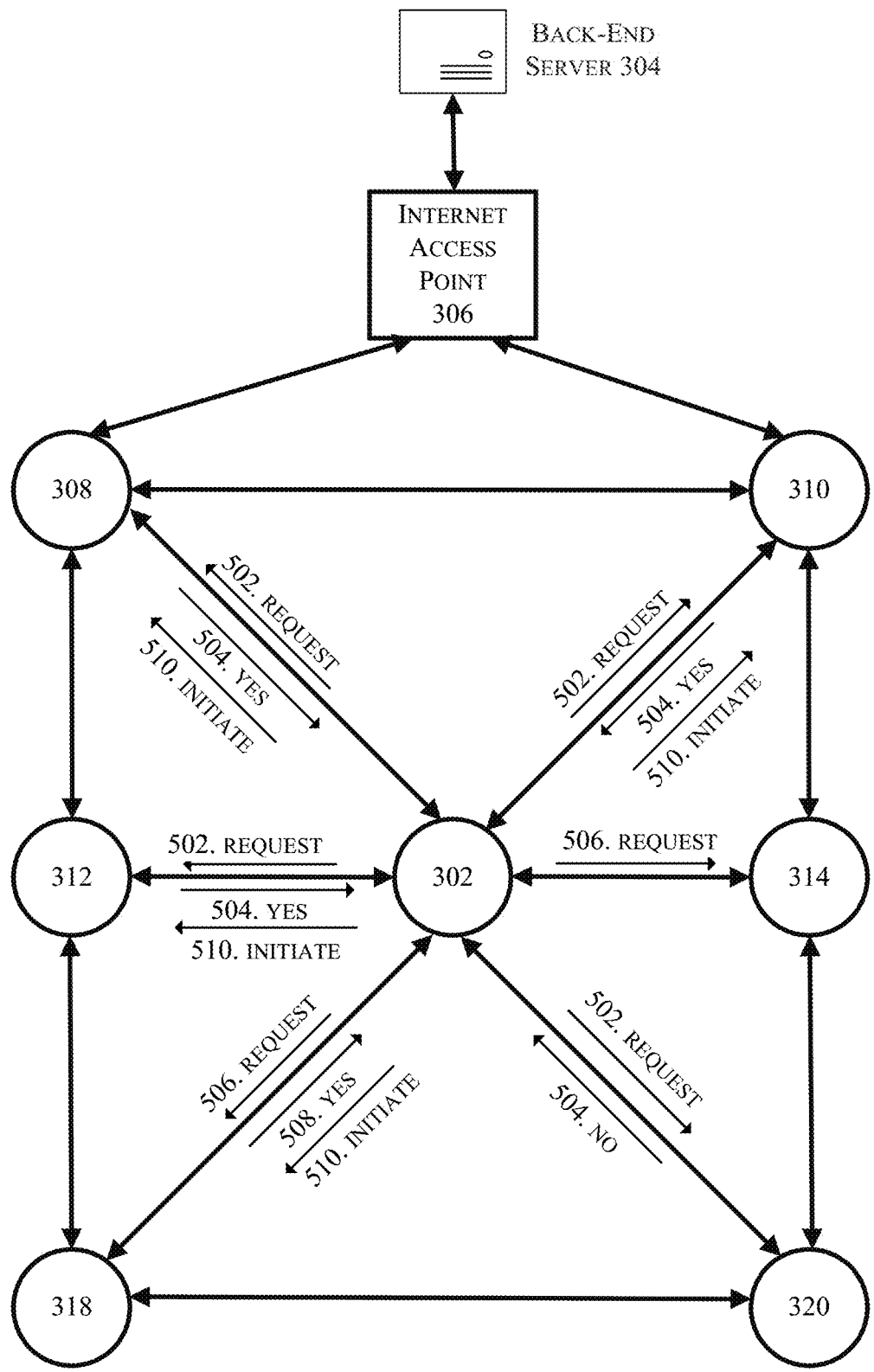
FIG. 5 is a diagram illustrating an example of how devices of the FIG. 3 example network may operate in accordance with the FIG. 4 example process, after selecting candidate participant devices.

FIG. 5 is a diagram illustrating an example of how devices of the example network 300 may operate in accordance with the FIG. 4 example process 400, after selecting, at 402, the device 308, the device 310, the device 312, the device 314, the device 318 and the device 320 as candidate participant devices. As shown in FIG. 5, at 404 of the process 400, the target device 302 generates a request (502) to some of the selected candidate participant devices, namely the device 308, the device 310, the device 312 and the device 320. For example, the target device 302 may have been configured (such as by the back-end server 304) to initially attempt to request four candidate participant devices to participate in the blockchain. The device 308, the device 310, the device 312 and the device 320 may be the selected candidate participant devices that have the four best link characteristics for the link from the target device 302 to the respective candidate participant device based on observed behavior of the links.

At 406 of the process 400, the target device 302 receives a reply 504 (either "yes" or "no") back from the device 308, the device 310, the device 312 and the device 320. In the FIG. 5 example, the reply 504 back from the device 308, the device 310 and the device 312 is "yes." The reply 504 back from the device 320 is "no."

At 408, the target device determines if enough candidate participant devices have indicated agreement to participate. For example, the target device 302 may have been configured (such as by the back-end server 304) to prefer four devices to participate in a blockchain. Since, in the FIG. 5 example, only three devices have indicated agreement to participate in the blockchain, the target device 302 repeats the operation 404 with an additional selected candidate participant device. In the example, at the repeat of operation 404, the target device 302 generates a request (506) to the device 314 and to the device 318 to participate in the blockchain.

At the repeat of operation 406, the target device 302 receives a reply (508) of "yes" from the device 318. A reply (not shown) from the device 314, if received, is ignored. That is, at this point, four devices—the device 308, the device 310, the device 312 and the device 318—have indicated agreement to participate in the blockchain. At 410, the target device 302 generates an initiation signal (510) to the device 308, the device 310, the device 312 and the device 318 to begin participating with the target device 302 in the blockchain. In this manner, the target device 302 can determine other devices in the network 300 that are suitable to participate in the blockchain.

Validation is a characteristic feature of blockchain. That is, every time a transaction is conducted on a blockchain, the transaction data is stored in a new block. This new block is added to the blockchain. The target device 302, that created the data, is the only device that has knowledge of the accuracy of the data, as the target device 302 generated the data and added it immediately to its blockchain. The target device 302 then delivers the added data to the other participants devices, that each added the data to its copy of the blockchain. The other participant devices each send a global hash for the blockchain back to the target device 302 as a verification that the added data was received. From that point forward, the data is now verifiable after the fact because it is in several chains, and each participant device will agree that the blockchain is the same, which provides verification of the entire blockchain. Since the hash each participant device returns to the target device 302 is a hash on the entire chain, this can be used to validate every block in the chain as "good". For example, a device verifies the block by creating and comparing the returned hash of the entire blockchain. If two or more participant nodes disagree as to the hash values, this signals that data of the blockchain in at least one of the participant nodes has been corrupted or otherwise altered.

In some examples, the participating devices provide the hash values to a back-end server or other central service that compares the hash values to determine any that disagree. In one example, if only one of the participating devices disagrees with the target device, then the central service notifies the participating device of the disagreement. Based upon the notification, the disagreeing participating device determines which block is bad and removes the bad block. The disagreeing participating device further requests the original block from a source device (e.g., from the target device) and recalculates the blockchain. In other examples, the target device performs the hash value comparison and, as appropriate, notifies participating devices of disagreement.

In some examples, all of the participating devices disagree with the target device. In this case, the target device determines the bad block, recovers the block from one of the participating devices and recalculates the block chain. In yet other examples, all of the participating devices including the target device agree, but the back-end server does not agree. In this case, the back-end server may recover the bad block from the target device and recalculate the blockchain.

Figure 6:
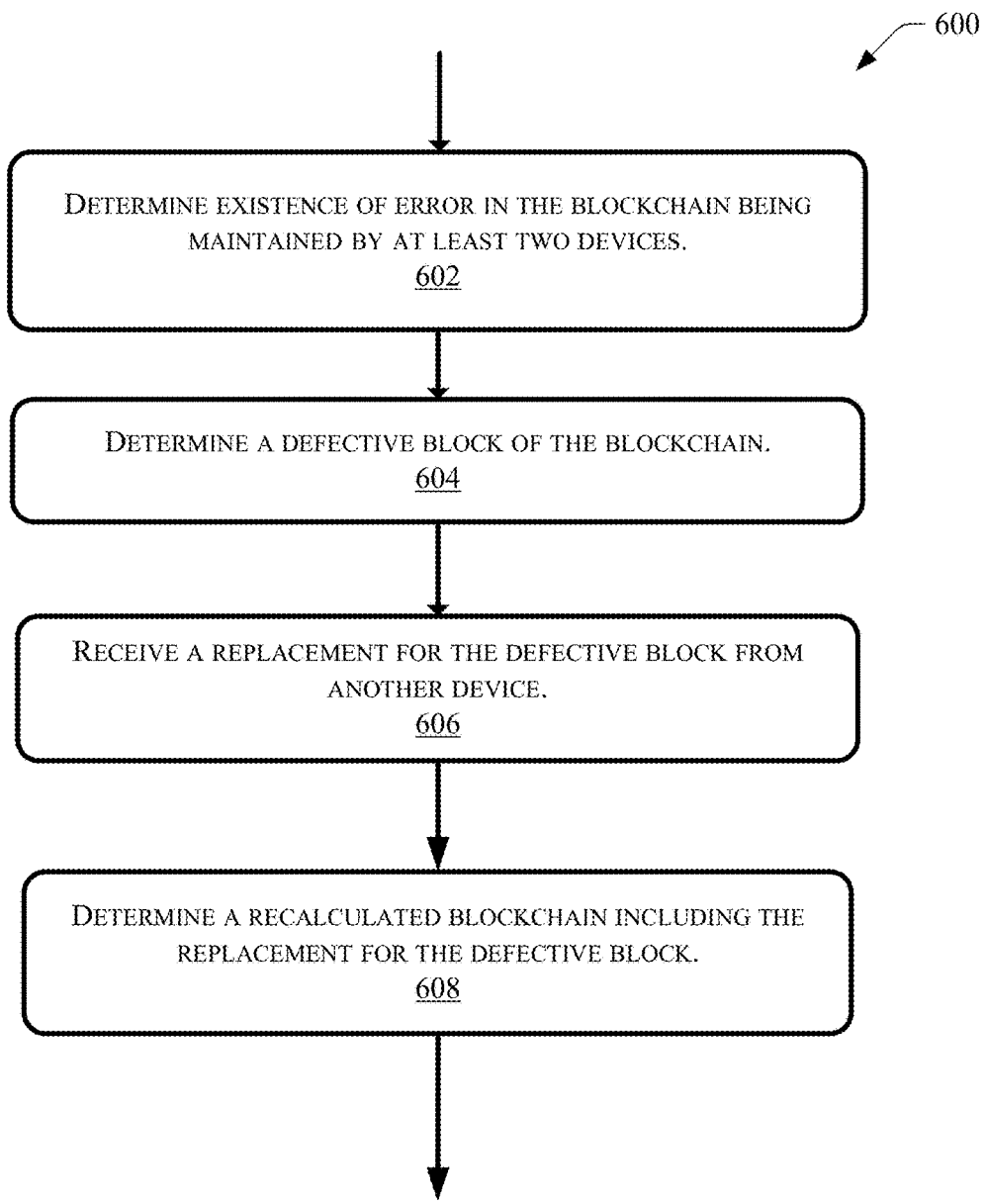
FIG. 6 is a flowchart illustrating a process by which a device may recognize and remedy a blockchain error.

FIG. 6 is a flowchart illustrating a process 600 by which a device may recognize and remedy a blockchain error. At 602, it is determined that an error exists in a blockchain being maintained by at least two devices. For example, a back-end server or a target device may determine that hash values reported in from various blockchain participants are not all in agreement. Based on which hash value or values are not in agreement, it may be inferred which of the devices is in error. For example, if all of the participating devices agree except for a target device, then it may be inferred that the target device is in error. If all of the participating devices including the target device agree, but a hash generated by the back-end server does not agree, then it may be inferred that the back-end server is in error.

For example, the back-end server may receive the hashes from the participating devices and, processing the received hashes, determine that one of the participating devices or the back-end server is in error. When the back-end server determines one of the participating devices is in error, the back-end server may send an indication of the device in error to the participating device in error and/or, even if the participating device in error is not the target device, to the target device. The target device may then send an indication to the participating device in error.

At 604, the participating device in error determines which block of the blockchain on the device is defective. At 606, the participating device in error receives a replacement for the defective block from another device, i.e., a device inferred to not be in error. For example, the target device may provide the replacement for the defective block in response to a request from the device in error. If the target device is the device in error, the target device may request the replacement from another one of the participating devices. At 608, the device in error determines a recalculated blockchain that includes the replacement for the defective block.

In some examples, in which the back-end server is determined to be in error, the back-end server may perform the operations 604, 606 and 608. For example, at 604, the back-end server may determine the defective block of the blockchain as maintained by the back-end server. For example, at 606, the back-end server may receive a replacement for the defective block. At 608, the back-end server may determine a recalculated blockchain including the replacement for the defective block.

Figure 7:
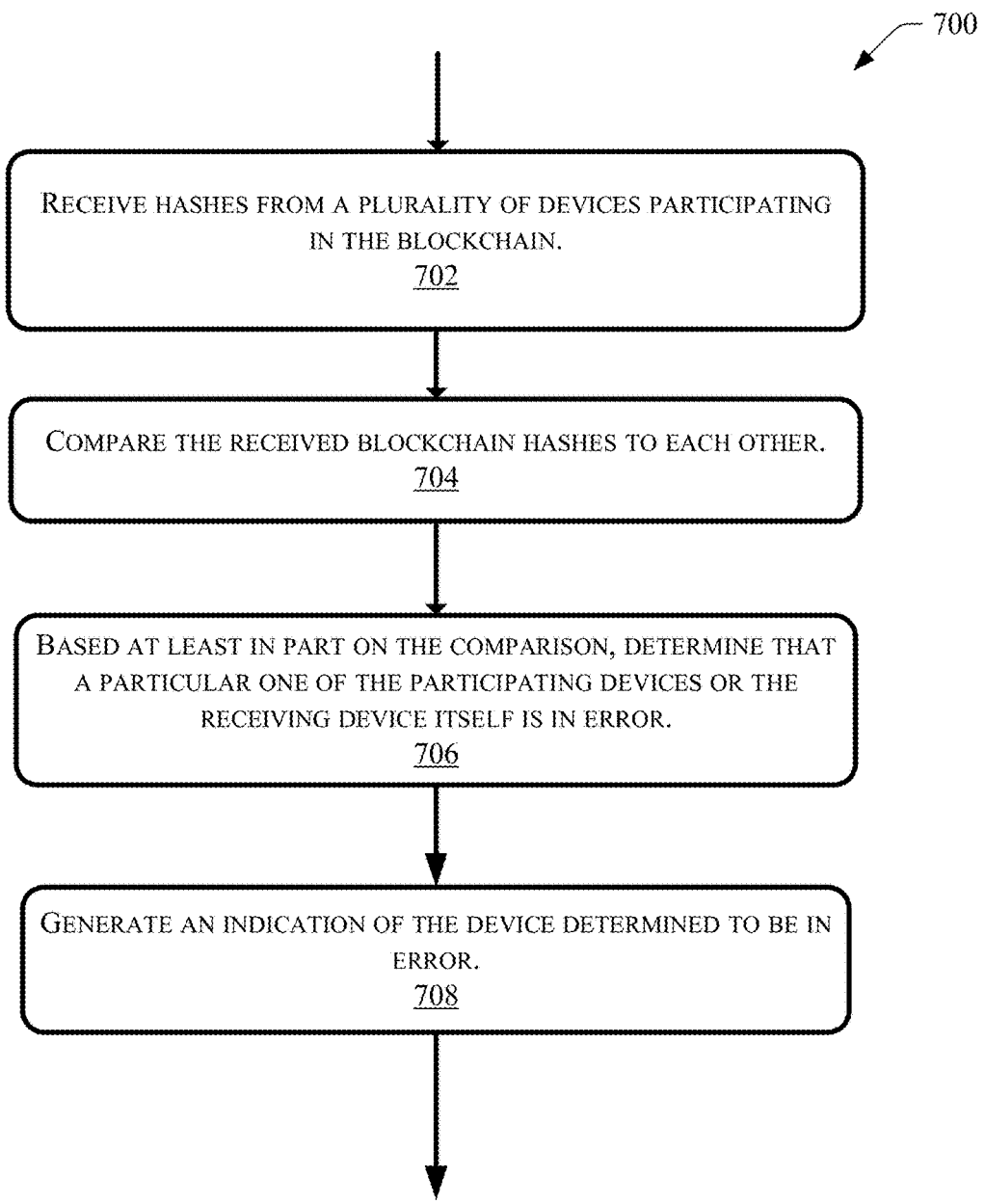
FIG. 7 is a flowchart illustrating a process by which a device, such as a back-end server, determines which device participating in a blockchain is exhibiting a blockchain error.

FIG. 7 is a is a flowchart illustrating a process 700 by which a device, such as the back-end server, determines which device is exhibiting a blockchain error. At 702, the device receives a blockchain hash from each of a plurality of participating devices. At 704, the device compares the received blockchain hashes to each other. At 706, based at least in part on the comparison, the device determines that a particular one of the participating devices is in error. For example, if all the blockchain hashes match except for one, then the device may infer that the blockchain participant that provided the non-matching blockchain hash is the device that is in error. As another example, if all the received blockchain hashes match each other, but they do not match the blockchain hash maintained by the device, then the device may infer that the device itself is in error. At 708, the device generates an indication of the device determined to be in error. For example, the device may generate the indication to send to the device determined to be in error. The device determined to be in error, once informed, may take steps to address the error, such as determining a defective block of the blockchain, receiving a replacement block and recalculating the blockchain.

Figure 8:
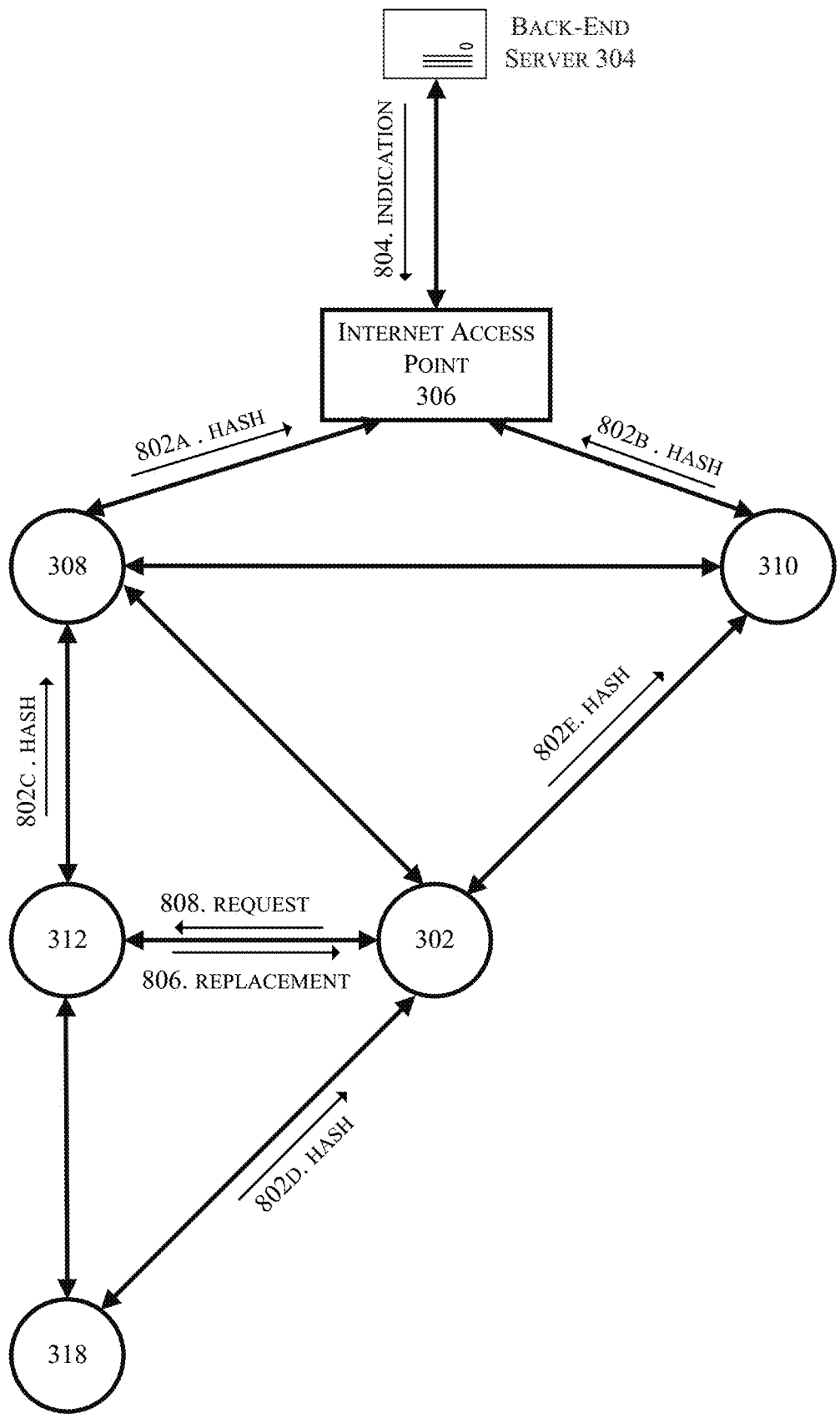
FIG. 8 is a diagram illustrating an example of how devices of the FIG. 3 example network may operate in accordance with the FIG. 6 example process and the FIG. 7 example process.

FIG. 8 is a diagram illustrating an example of how devices of the example network 300 may operate in accordance with the FIG. 6 example process 600 and the FIG. 7 example process 700. In the FIG. 8 example, the participating devices are the device 308, the device 310, the device 312 and the device 318, participating in a blockchain with the target device 302. Referring to 702 of the process 700 and also referring to FIG. 8, the back-end server 304 may receive hashes (collectively, 802) from each of the device 308, the device 310, the device 312 and the device 318, and the target device 302. A route the hashes 802 take from each of the device 308, the device 310, the device 312 and the device 318, and the target device 302 may be a result, for example, of how the devices are configured for mesh network communication. For example, as shown in FIG. 8, the device 308 may provide a hash 802a to the back-end server 304 directly via the internet access point 306. Similarly, the device 310 may provide a hash 802b to the back-end server 304 directly via the internet access point 306. The device 312 may provide a hash 802c to the back-end server 304 via the device 308. The device 318 may provide a hash 802d to the back-end server 304 via the device 302. The device 302 may provide a hash 802e to the back-end server 304 via the device 310.

Continuing with the example and referring to 704 and 706 of the FIG. 7 process, the back-end server 304 may compare the hashes 802a, 802b, 802c, 802d and 802e and determine that the target device 302 is in error. This is just one example and, in other examples, the back-end server 304 may determine that another one or more of the devices is in error, that none of the devices are in error or that the back-end server 304 itself is in error. At 708, the back-end server 304 may generate an indication 804 of the target device 302, determined to be in error.

Referring now to 602 of the FIG. 6 process 600, the target device 302 may determine the existence of error in the blockchain by, for example, having received the indication 804 of the target device 302 generated by the back-end server 304 at 708 of the FIG. 7 process 700. Referring to 604 of the process 600, the target device 302 may determine a defective block of the blockchain and, at 606, the target device 302 may receive a replacement 806 for the defective block from the device 312. For example, the device 312 may provide the replacement 806 to the target device 302 in response to the target device 302 making a request 808 to the device 312 for the replacement 806. In some examples, the target device 302 may request each of the participating devices—the device 308, the device 310, the device 312 and the device 318—to send its hash, and the target device 302 may request replacement from one of the participating devices whose hash matches hashes provided from other participating devices. Further, in some examples, the target device 302 may request the entire chain rather than a single block. At 608, the target device 302 may determine a recalculated blockchain including the replacement 806.

As a blockchain grows, the amount of storage space for a device to maintain the blockchain correspondingly grows. For resource constrained devices in particular, this can put a strain on a device and, for example, affect the ability of the device to perform other non-blockchain processing. For example, in a utility network, the growing amount of storage for the blockchain could affect the ability of an electric meter to continue monitoring electricity usage and performing other non-blockchain processing.

In some examples, one or more devices participating in a blockchain may, at appropriate times, remove blocks of the blockchain. This may, for example, free up storage space for data to be added to the blockchain. In some examples, the one or more devices may evaluate the amount of storage being used by the blockchain and, when the amount of storage being used by the blockchain is above a particular amount, the one or more devices may remove some of the block of the blockchain. This may include removing the oldest data of the blockchain and regenerating the blockchain without the oldest data.

In some examples, a network/system user chooses the disk storage allocation D in total allowed bytes. The value S may be a number of bytes generally used per day per block. The value M is used as the total storage available on a device in bytes. A calculation of how long blocks should be stored on a local device may weigh into the determination of the variables, including a designation of how many blockchains in which a particular device may participate.

A periodic trim check may be used, and a period P for the trim check may determine when a device is to check for being close to or over its designated storage limit. For example, a value Z may be selected as a comparator to the total value of M as a percentage (or can be used as a size in bytes) of the physical limit. For example, when the calculation of "Storage Remaining %"<=Z %, a trim may be performed. This value may be zero if a "little over the storage limit is OK." If it is not, the % used may be a value where a device would generally not be able to accumulate more bytes than would exceed the value of M in period P.

A value "Amount to remove," V may be designated in several different ways. As some examples, the designation may be in bytes to remove, blocks to remove, or a percentage of the total storage. It may be advantageous to balance the frequency at which the trim is performed. If the trim is performed often, for example, this may invoke a CPU-intensive operation for regenerating the blockchain. The length of this operation may approach the length of time between trims.

In one example, the "Total block count to remove" may be calculated as:

Number of Bytes to Remove,$R=M*V\%$

Number of Blocks to Remove=$R/S$

In one example, the evaluation (and possible trim) process may operate at period P. At each evaluation, if the value Storage Remaining % is less than or equal to the value Z %, the trim algorithm runs. The number of blocks to trim is calculated and that number of blocks is removed. At this point, all blocks recalculate their hashes back to the new root (first) block in the chain. This operation can take a long time. In some examples, the amount of time the operation takes may be on the order of less than half of the block generation period, which may give all participants in the blockchain opportunity to do the recalculation before data is added to the blockchain at the next block generation.

This trim process may be performed at same time as block generation, for example, performed after a block is generated, but before the new block is sent to the other members of the blockchain group. For example, in conjunction with the new block being sent, a header sent along with the new block to describe the new block may also include fields describing the number of blocks to remove (and possibly other guidance to assist in maintaining blockchain synchronization among the blockchain participants).

Figure 9:
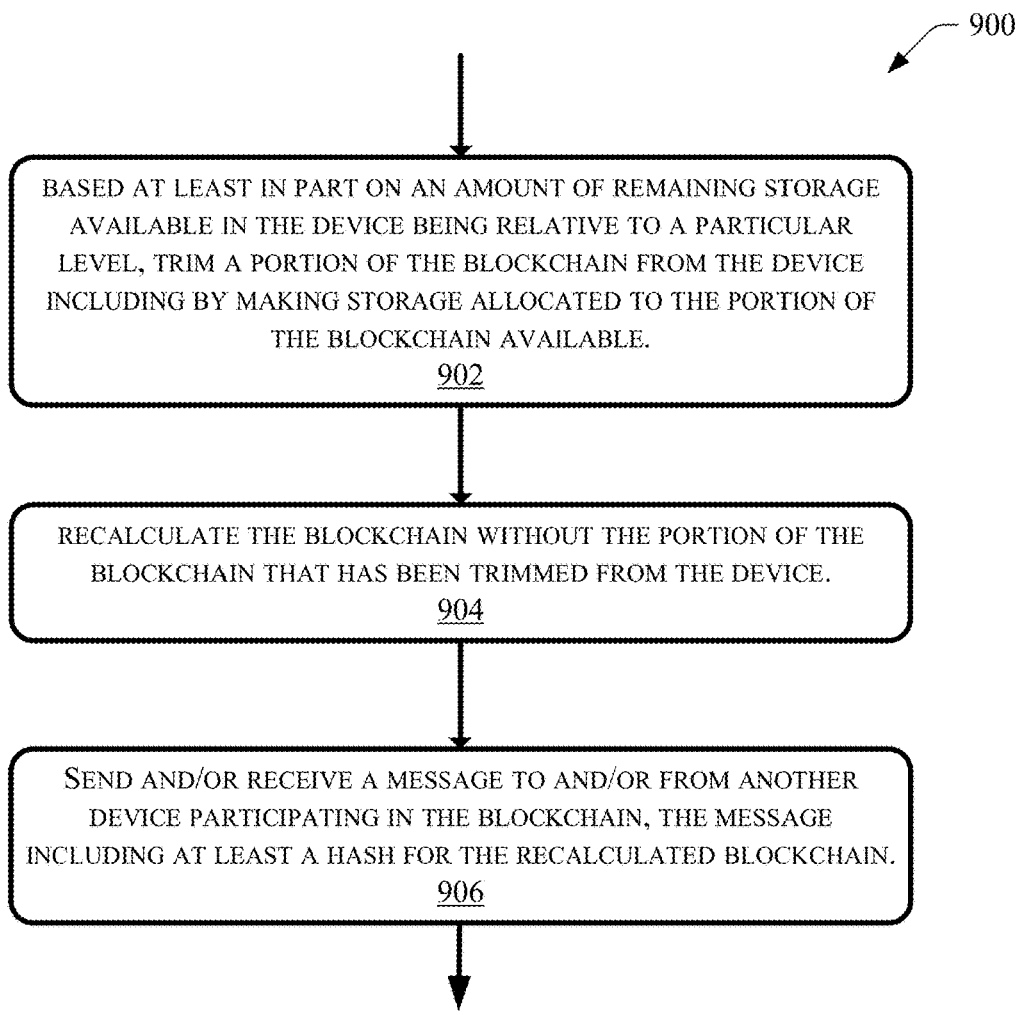
FIG. 9 is a flowchart illustrating a process by which a device, such as a target device, may determine to trim a blockchain and may then trim the blockchain.

FIG. 9 is a flowchart illustrating a process 900 by which a device, such as a target device, may determine to trim a blockchain and may then trim the blockchain. Referring to FIG. 9, at 902, based at least in part on an amount of remaining storage available in the device being relative to a particular level, the device trims a portion of the blockchain from the device including by making storage allocated to the portion of the blockchain available. For example, the device may trim the oldest data in the blockchain. In one example, the blockchain includes utility usage data, and the device may trim the oldest utility usage data in the blockchain.

At 904, the device recalculates the blockchain without the portion of the blockchain that has been trimmed from the device. For example, after trimming the oldest data in the blockchain, the device may recalculate the blockchain without the removed oldest data. In some examples, the device may trim data, such as the oldest data, at the same time as adding a block for new data. In this way, the device may recalculate the blockchain to include the new data as well as to account for the trimmed oldest data.

At 906, the device sends and/or receives a message to and/or from another device participating in the blockchain. Whether the device sends or receives the message may be based at least in part on whether the device is the target device—in which case it would generally receive the message and, otherwise, would generally send the message. The message includes at least an indication of an amount of the blockchain for the other device to trim. The device and the other device may be preconfigured to remove the oldest data in a similar manner. For example, it may be a potential security risk to communicate, among the devices, an amount to be trimmed, given that some of the devices may be compromised. A compromised device that receives an indication of the amount to trim may be unnecessarily aided in maintaining consistency and concealing the compromise.

In some examples, the device may send the message in conjunction with receiving a message that includes data to be added to the blockchain. This may streamline communication between the device and the other device since, for example, the same communication overhead may be amortized over the communication of the indication of the hash and the data to be added to the blockchain. In addition, the other device may recalculate the blockchain to include the new data as well as to account for the trimmed oldest data, where the recalculated blockchain for which the hash is sent is includes the new data and does not include the trimmed oldest data.

Furthermore, if more than the other device is participating in the blockchain with the device, the device may send the indication of the data to be trimmed to one or more of those other devices that are participating in the blockchain with the device.

For example, the device performing the operations of the process 900 may be the target device 302. The target device 302 may, at 902, trim at least a portion of a blockchain from the target device 302. The target device 302 may, at 904, recalculate the blockchain without the portion of the blockchain that has been trimmed from the target device 302. At 906, the target device 302 may send a message to the devices participating in the blockchain—the device 308, the device 310, the device 312 and the device 318—the message including at least an indication of an amount of the blockchain for the other device to trim.

The target device 302 may send the message to the device 308, the device 310, the device 312 and the device 318 along with data to add to the blockchain. This may streamline communication between the target device 302 and the other devices participating in the blockchain, as well as allowing the other devices participating in the blockchain to recalculate the blockchain to include the new data as well as to account for the trimmed oldest data.

Figure 10:
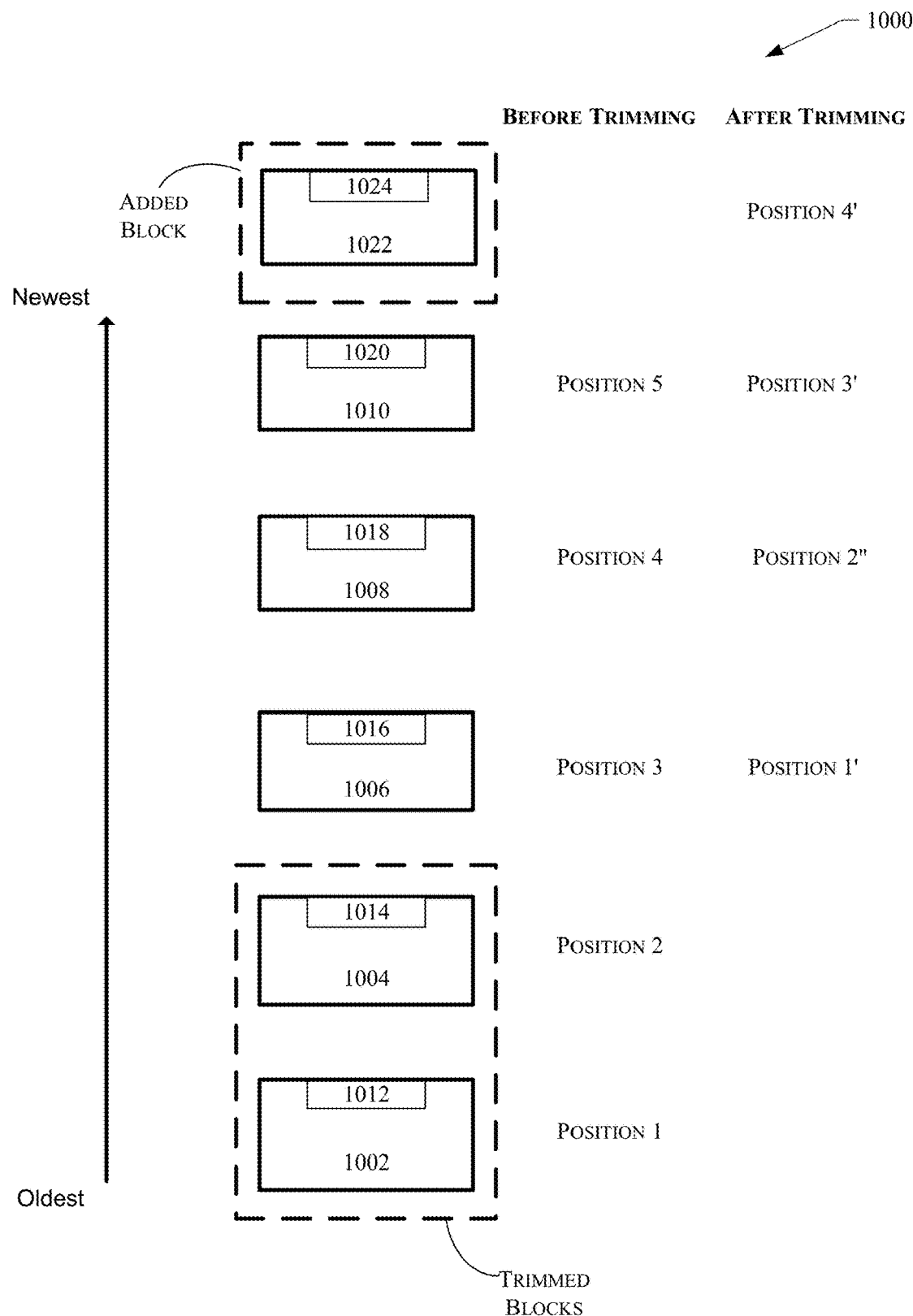
FIG. 10 illustrates an example blockchain being maintained by a device. The blockchain may be trimmed by the device, such as in accordance with the FIG. 9 example process.

FIG. 10 illustrates an example blockchain 1000 being maintained by a device. The blockchain 1000 may be trimmed by the device, such as in accordance with the FIG. 9 example process. The blockchain 1000, before trimming, includes a block 1002, which is the oldest block in the blockchain and is at "Position 1" in the blockchain, with the oldest data in the blockchain. From next oldest to newest, the blockchain before trimming also includes a block 1004 at Position 2, a block 1006 at Position 3, a block 1008 at Position 4 and a block 1010 at Position 5. The blockchain 1000 is a simplistic example, as many blockchains may have hundreds of thousands of blocks or more.

Each of block 1002, block 1004, block 1006, block 1008 and block 1010 include data of multiple transactions, such as up to five hundred transactions or more. Each of block 1002, block 1004, block 1006, block 1008 and block 1010 includes a respective hash value 1012, hash value 1014, hash value 1016, hash value 1018 and hash value 1020. In an example, the device determines the hash value for a block based at least in part on the data of the block and the hash of the block in the previous position. For example, for the block 1010 at Position 5 in the blockchain 1000 before trimming, the block 1008 is in the previous position (Position 4) in the blockchain 1000. Therefore, in the example, the device determines the hash 1020 for the block 1010 based at least in part on the data of the block 1010 and the hash 1018 of the block 1008.

With respect to the FIG. 9 trimming process 900 and referring to the FIG. 10 example blockchain 1000, at 902, the device may trim a portion of the blockchain 1000 by making storage allocated to a portion of the blockchain 1000 available. For example, the device 902 may determine to remove two blocks of the blockchain 1000. Thus, for example, the device may determine to remove the block 1002 at Position 1 and the block 1004 at Position 2 by making the storage allocated to the block 1002 and to the block 1004 available. Thus, the block 1006 becomes the block at Position 1' of the blockchain 1000 after trimming, the block 1008 becomes the block at Position 2' and the block 1010 becomes the block at Position 3'. Furthermore, the device may be adding a new block 1022 at the time of trimming the block 1002 and the block 1004, and the new block 1022 becomes the block at position 4'.

Continuing with the example, at 904, the device may recalculate the blockchain 1000 considering the trimmed block 1002 and the trimmed block 1004 and also considering the new block 1022. In recalculating the blockchain 1000, the device may calculate the hash 1016, the hash 1018, the hash 1020 and the hash 1024. For example, the device may calculate the hash 1016 based at least in part on the data of the block 1006. The device may calculate the hash 1018 based at least in part on the data of the block 1008 and on the hash 1016. The device may calculate the hash 1020 based at least in part on the data of the block 1010 and on the hash 1018. Furthermore, the device may calculate the hash 1024, for the new block 1022, based at least in part on the data of the new block 1022 and on the hash 1020.

At 906, the device may send a message to another device participating in the blockchain 1000. The message may include at least an indication of the amount of the blockchain for the other device to trim, such as the number of blocks to trim. For example, the target device 302 may send such a message to the device 308, the device 310, the device 312 and/or the device 318. The message may also include data of a block to add to the blockchain 1000. Based at least in part on receiving the message, the other device may also trim the block 1002 and the block 1004 and add the new block 1022. The other device may recalculate the blockchain 1000 in a manner similar to that just discussed, by recalculating and newly calculating the various hash values as appropriate. As a result, the target device and the participating devices should have matching versions of the trimmed and added blockchain such that another device, such as the back-end server 304, may validate transactions in the blocks of the blockchain 1000.

CONCLUSION

The techniques described herein improve how a network manages one or more blockchains, such as a network that is constrained with respect to storage and communication bandwidth. Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method to form a blockchain, comprising:
by a device, selecting a plurality of other devices to participate in the blockchain based at least in part on factors comprising:
observed behavior of a communication link between the device and each of the other devices;
communication based on a one-hop neighbor relationship; and
a number of participant devices that the device is configured to select; and
by the device and based at least in part on the selecting, participating in the blockchain with at least some of the plurality of other devices.

2. The method of claim 1, further comprising:
by the device, causing a first request to be sent to a first one of the plurality of other devices to participate in the blockchain; and
based at least in part on a response from the first one of the plurality of other devices, causing a second request to be sent to a second one of the plurality of other devices to participate in the blockchain.

3. The method of claim 2, wherein the response from the first one of the plurality of other devices includes at least an indication denying the first request to participate in the blockchain.

4. The method of claim 1 wherein participating in the blockchain with at least some of the plurality of other devices includes:
sending data of the blockchain to the at least some of the plurality of other devices; and
calculating one or more parameters of the blockchain based at least in part on the data of the blockchain.

5. The method of claim 1, further comprising:
receiving a request for data of the blockchain from at least one of the plurality of other devices.

6. The method of claim 1, further comprising:
reporting, to a central authority, an indication of the at least some of the plurality of other devices.

7. The method of claim 1, wherein the factors additionally comprise:
a packet success rate between the device and each of the other devices; and
a signal-to-noise ratio between the device and each of the other devices.

8. A network communication device, comprising:
a radio configured to communicate with a plurality of other network communication devices;
one or more processors communicatively coupled to the radio; and
memory communicatively coupled to the one or more processors, the memory storing one or more instructions that, when executed by the one or more processors, cause the one or more processors to perform operations comprising:
selecting the plurality of other network communication devices to participate in a blockchain based at least in part on factors comprising:
communication based on a one-hop neighbor relationship;
a number of participant devices that the network communications device is configured to select; and
observed behavior of a communication link between the network communication device and each of the other network communication devices; and based at least in part on the selecting, participating in the blockchain with at least some of the plurality of other network communication devices.

9. The network communication device of claim 8, the operations further comprising:
   causing a first request to be sent to a first one of the plurality of other network communication devices to participate in the blockchain; and
   based at least in part on a response from the first one of the plurality of other network communication devices, causing a second request to be sent to a second one of the plurality of other network communication devices to participate in the blockchain.

10. The network communication device of claim 9, wherein the response from the first one of the plurality of other network communication devices includes at least an indication denying the first request to participate in the blockchain.

11. The network communication device of claim 8, wherein participating in the blockchain with at least some of the plurality of other network communication devices includes:
   sending data of the blockchain to the at least some of the plurality of other network communication devices; and
   calculating parameters of the blockchain based at least in part on the data of the blockchain.

12. The network communication device of claim 8, the operations further comprising:
   reporting, to a central authority, an indication of the at least some of the plurality of other network communication devices.

13. The network communication device of claim 8, the operations further comprising:
   reporting, to a central authority, an indication of at least one hash of the blockchain.

14. The network communication device of claim 8, wherein the observed behavior includes at least packet success rate between the network communication device and each of the other network communication devices.

15. One or more non-transitory computer-readable media storing computer-executable instructions that, when executed, cause one or more processors of a device to perform operations comprising:
   selecting a plurality of other devices to participate in a blockchain based at least in part on factors comprising:
      observed behavior of a communication link between the device and each of the other devices;
      communication based on a one-hop neighbor relationship; and
      a number of participant devices that the device is configured to select; and
   based at least in part on the selecting, participating in the blockchain with at least some of the plurality of other devices.

16. The one or more non-transitory computer-readable media of claim 15, the operations further comprising:
   causing a first request to be sent to a first one of the plurality of other devices to participate in the blockchain; and
   based at least in part on a response from the first one of the plurality of other devices, causing a second request to be sent to a second one of the plurality of other devices to participate in the blockchain.

17. The one or more non-transitory computer-readable media of claim 16, wherein the response from the first one of the plurality of other devices includes at least an indication denying the first request to participate in the blockchain.

18. The one or more non-transitory computer-readable media of claim 15, wherein participating in the blockchain with at least some of the plurality of other devices includes:
   sending data of the blockchain to the at least some of the plurality of other devices; and
   calculating parameters of the blockchain based at least in part on the data of the blockchain.

19. The one or more non-transitory computer-readable media of claim 15, the operations further comprising:
   reporting, to a central authority, an indication of the at least some of the plurality of other devices.

20. The one or more non-transitory computer-readable media of claim 15, the operations further comprising:
   reporting, to a central authority, an indication of at least one hash of the blockchain.

* * * * *